United States Patent
Noruschat et al.

(10) Patent No.: US 11,473,641 B2
(45) Date of Patent: Oct. 18, 2022

(54) VIBRATION DAMPER COMPRISING A LEAKAGE INDICATOR, LEAKAGE INDICATOR, METHOD FOR INDICATING A LEAK IN A VIBRATION DAMPER AND COLOUR CHANGE INDICATOR FOR USE AS LEAKAGE INDICATOR

(71) Applicants: THYSSENKRUPP BILSTEIN GMBH, Ennepetal (DE); thyssenkrupp AG, Essen (DE)

(72) Inventors: Tim Noruschat, Wuppertal (DE); Haris Bajramovic, Witten (DE)

(73) Assignees: THYSSENKRUPP BILSTEIN GMBH, Ennepetal (DE); THYSSENKRUPP AG, Essen (DE)

( * ) Notice: Subject to any disclaimer, the term of this patent is extended or adjusted under 35 U.S.C. 154(b) by 39 days.

(21) Appl. No.: 16/964,284

(22) PCT Filed: Jan. 30, 2019

(86) PCT No.: PCT/EP2019/052177
§ 371 (c)(1),
(2) Date: Jul. 23, 2020

(87) PCT Pub. No.: WO2019/149721
PCT Pub. Date: Aug. 8, 2019

(65) Prior Publication Data
US 2021/0033162 A1 Feb. 4, 2021

(30) Foreign Application Priority Data
Feb. 1, 2018 (DE) .................... 10 2018 201 530.9

(51) Int. Cl.
*F16F 9/32* (2006.01)
*B60G 13/08* (2006.01)
*F16F 9/19* (2006.01)

(52) U.S. Cl.
CPC ............ *F16F 9/3264* (2013.01); *B60G 13/08* (2013.01); *F16F 9/19* (2013.01); *B60G 2202/24* (2013.01);
(Continued)

(58) Field of Classification Search
CPC ........ F16F 9/3264; F16F 9/19; F16F 2222/12; F16F 2230/0047; F16F 2230/24;
(Continued)

(56) References Cited

U.S. PATENT DOCUMENTS

| 4,685,253 A * | 8/1987 | Bitterly .................... E04C 3/10 52/2.11 |
| 9,662,951 B1 | 5/2017 | Carlberg et al. |

(Continued)

FOREIGN PATENT DOCUMENTS

| CN | 203453374 U | 2/2014 |
| DE | 10 95 057 B | 12/1960 |

(Continued)

OTHER PUBLICATIONS

English abstract of CN203453374U.
English Translation of International Search Report issued in PCT/EP2019/052177, dated Mar. 14, 2019.

*Primary Examiner* — Robert A. Siconolfi
*Assistant Examiner* — James K Hsiao
(74) *Attorney, Agent, or Firm* — thyssenkrupp North America, LLC

(57) ABSTRACT

A vibration damper for vehicles includes a damper tube which is at least partially filled with damper medium and which has a longitudinal axis along which a piston rod is movable back and forth. A working piston is movable jointly with the piston rod, by means of which working piston the interior space of the damper tube is divided into a piston-rod-side working space and a piston-rod-remote working (Continued)

space. The vibration damper has a leakage indicator for the damper medium.

18 Claims, 4 Drawing Sheets

(52) U.S. Cl.
 CPC ...... *B60G 2206/41* (2013.01); *B60G 2600/08* (2013.01); *B60G 2800/162* (2013.01); *F16F 2222/12* (2013.01); *F16F 2230/0047* (2013.01); *F16F 2230/24* (2013.01); *F16F 2232/08* (2013.01); *F16F 2234/02* (2013.01)

(58) Field of Classification Search
 CPC .. F16F 2232/08; F16F 2234/02; B60G 13/08; B60G 2202/24; B60G 2206/41; B60G 2600/08; B60G 2800/162
 See application file for complete search history.

(56) References Cited

U.S. PATENT DOCUMENTS

| | | | |
|---|---|---|---|
| 9,982,737 B2* | 5/2018 | Beltran | .................... F16F 1/38 |
| 10,436,275 B2* | 10/2019 | Mehta | ........................ B60J 5/10 |
| 10,539,203 B2* | 1/2020 | Kunkel | .................. G07C 5/006 |
| 2011/0048879 A1 | 3/2011 | Wang | |
| 2016/0290428 A1* | 10/2016 | Beltran | .................... F16F 7/087 |
| 2019/0178327 A1* | 6/2019 | Kunkel | .................. G07C 5/006 |

FOREIGN PATENT DOCUMENTS

| | | |
|---|---|---|
| DE | 34 34 011 A | 3/1986 |
| DE | 42 04 939 C | 5/1999 |
| DE | 20 2008 007669 U | 10/2008 |
| DE | 10 2010 035 576 A | 4/2011 |
| DE | 10 2010 014 340 A | 2/2012 |

* cited by examiner

VIBRATION DAMPER COMPRISING A LEAKAGE INDICATOR, LEAKAGE INDICATOR, METHOD FOR INDICATING A LEAK IN A VIBRATION DAMPER AND COLOUR CHANGE INDICATOR FOR USE AS LEAKAGE INDICATOR

CROSS REFERENCE TO RELATED APPLICATIONS

This application is a U.S. National Stage Entry of International Patent Application Serial Number PCT/EP2019/052177, filed Jan. 30, 2019, which claims priority to German Patent Application No. DE 10 2018 201 530.9, filed Feb. 1, 2018, the entire contents of both of which are incorporated herein by reference.

FIELD

The present disclosure generally relates to a vibration damper comprising a leakage indicator.

BACKGROUND

Vibration dampers and leakage indicators of this type are hitherto unknown in the prior art in the embodiments according to the invention.

A problem in the case of the vibration dampers known in the prior art is that a leakage of a vibration damper, and in particular the degree of leakage thereof, cannot be objectively assessed, and it is normally also not possible to easily perform an assessment from the outside, it rather normally being necessary for the vibration damper to be destructively opened, which is furthermore time-consuming, highly cumbersome and must be performed by experts.

Thus a need exists for providing an improved vibration damper in the case of which the above-stated disadvantages are avoided. In particular, with this improved vibration damper and an improved method for indicating a leakage of a vibration damper, it is the intention to provide a facility for assessing a leakage of the vibration damper, which assessment can be performed objectively, reliably, easily, in a technically uncomplicated manner, even by untrained persons, and in particular without the need to destroy a vibration damper.

DETAILED DESCRIPTION

Figure 1:
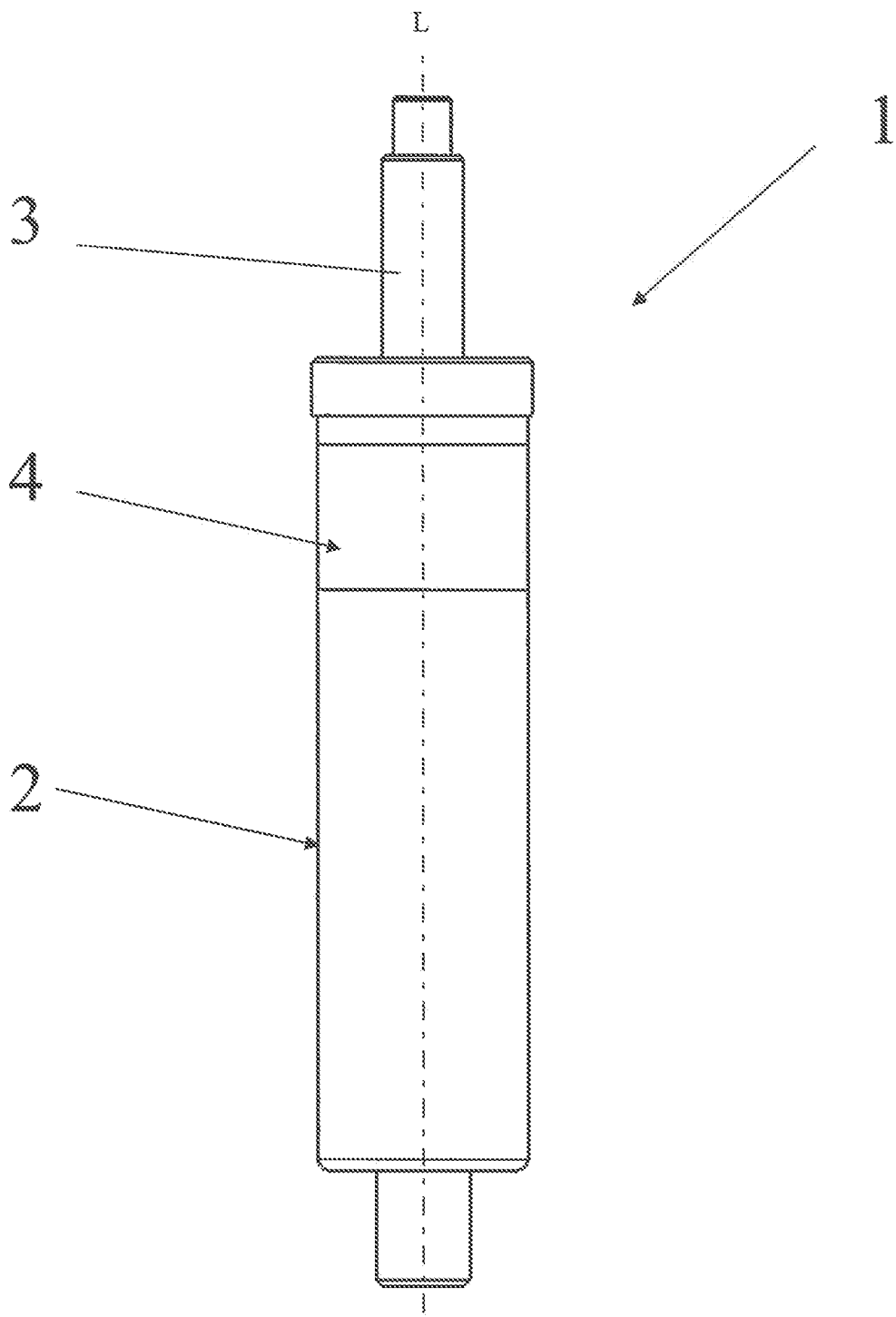
FIG. 1 is a plan view of a vibration damper according to an embodiment.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention relates to a vibration damper comprising a leakage indicator, a leakage indicator, a method for indicating a leakage of a vibration damper, and a color change indicator for use as a leakage indicator.

The subject matter of the invention is a vibration damper for vehicles, comprising a damper tube which is at least partially filled with damper medium and which has a longitudinal axis along which a piston rod is movable back and forth, wherein a working piston is movable jointly with the piston rod, by means of which working piston the interior space of the damper tube is divided into a piston-rod-side working space and a piston-rod-remote working space, wherein the damper tube has an outer wall, wherein the vibration damper has at least one leakage indicator for the damper medium.

A further subject matter of the invention is a leakage indicator for arrangement on a vibration damper according to as claimed in any of the preceding claims 1 to 5, wherein the at least one leakage indicator comprises a leakage indicator for indicating the leakage of the damper medium upon contact therewith.

A further subject matter of the invention is a method for indicating a leakage of a vibration damper as claimed in any of claims 1 to 5, comprising the steps:
a) providing the vibration damper, comprising at least one leakage indicator,
b) leakage of the vibration damper provided in step a), with an at least partial escape of the damper medium of the vibration damper provided in step a),
c) contact of the damper medium, which has at least partially escaped in step b), with the at least one leakage indicator of the vibration damper provided in step a),
d) indication of the contact, which has occurred in step c), of the damper medium, which has at least partially escaped, with the at least one leakage indicator of the vibration damper which has leaked in step b).

A further subject matter of the invention is a color change indicator for use as a leakage indicator in a vibration damper for vehicles as claimed in any of claims 1 to 5.

The present invention may be realized in a vibration damper and in a leakage indicator and also in a method for indicating a leakage of a vibration damper, and in a color change indicator for use as a leakage indicator in a vibration damper for vehicles.

The vibration damper according to the invention has the advantage over conventional vibration dampers that, in the event of a leakage of the vibration damper, this can be indicated, and in particular, the extent of the leakage can be objectively assessed. Furthermore, the assessment can be performed easily and from the outside without the need for the vibration damper to be destructively opened. Furthermore, the assessment can be performed quickly and without intensive technical training.

The method according to the invention for indicating a leakage of a vibration damper has the advantage over conventional methods that, in the event of a leakage of the vibration damper, this can be indicated, and in particular, the extent of the leakage can be objectively assessed. Furthermore, the assessment can be performed easily and from the outside without the need for the vibration damper to be destructively opened. Furthermore, the assessment can be performed quickly and without intensive technical training.

MORE DETAILED DESCRIPTION OF THE INVENTION

In the context of the present invention, a damper medium is to be understood to mean a medium which is selected from a group comprising a damping fluid, a damping gas, a lubricant, a coolant, a ferrofluid, a color change composition or a combination of these.

In particular, a damper medium is selected from a group comprising a dispersion, a solids mixture, a suspension, an aerosol, an inclusion, an emulsion, a foam or a combination of these. For example, the damper medium may be from a group comprising an oil composition, in particular TITAN SAF 1579 EU 175 BLUE, TITAN SAF 4257 EU 50, TITAN SAF 5045 EU 137 RED, VITAMOL ZH-M, CASTROL HYSPIN ZH-M, PENTOSIN or a combination of these, a coolant composition, in particular a Glysantin composition, such as for example BASF G11, BASF G12 or a combination of these, a grease composition, a gas composition, in particular nitrogen, oxygen or a combination of these, a particle composition or a combination of these.

In a further embodiment of the invention, the at least one leakage indicator comprises at least one indicator reaction composition for reaction with the damper medium upon contact therewith.

In the context of the present invention, an indicator reaction composition is to be understood to mean the composition of an indicator which reacts upon contact with the damper medium, and an indication occurs. An indication may for example be a color change. Contact of the damper medium with the at least one leakage indicator occurs for example upon the leakage of a vibration damper, in particular if damper medium escapes via the closure assembly of the vibration damper and moves on the outer wall of the vibration damper as far as the leakage indicator.

According to a further embodiment of the invention, the at least one leakage indicator is arranged in an at least partially radially encircling manner on the damper tube, in particular on the outer wall of the damper tube.

In a further embodiment of the invention, the at least one leakage indicator is arranged on the damper tube in a region in which the outer wall of the damper tube is not covered, in particular is visible from the outside.

In a further embodiment of the invention, the at least one leakage indicator has at least one distributing element for at least partially distributing the damper medium at least partially in a circumferential direction of the damper tube upon contact of the damper medium with the at least one leakage indicator. Contact of the damper medium with the at least one leakage indicator occurs for example upon the leakage of a vibration damper, in particular if damper medium escapes via the closure assembly of the vibration damper and moves on the outer wall of the vibration damper as far as the leakage indicator.

In the context of the present invention, a distributing element is to be understood to mean an element which can distribute damper medium at least in a circumferential direction of the damper tube. For example, a distributing element is selected from a group comprising a sleeve, a channel, a ring, in particular an annulus, a crown, a run-off edge, a recess, an elevation, in particular a stamped protuberance, a bead or a combination of these.

In a further embodiment of the invention, the at least one leakage indicator is at least partially covered by at least one protective element.

In the context of the present invention, a protective element is to be understood to mean an element which protects the leakage indicator against external influences, such as mechanical exertions of force, contamination, in particular dust, road dirt, weather influences, further emissions, in particular fluids, greases, particles, emulsions or a combination of these. For example, a protective element is selected from a group comprising a film, in particular an adhesive film, a hose, in particular a shrink-fit hose, a coating, a lacquer, a sealant, a tubular portion, in particular a slotted tubular portion, a cover, in particular a sheet-metal cover, or a combination of these.

According to a further embodiment of the invention, the at least one indicator reaction composition of the at least one leakage indicator comprises at least one color change composition, wherein the color change composition has a first color and changes to a second color upon contact with the damper medium.

According to a further embodiment of the method according to the invention, the vibration damper provided in step a) additionally has at least one distributing element, wherein the damper medium, which has at least partially escaped in step b), is at least partially distributed in a circumferential direction of the damper tube by means of the additional at least one distributing element.

In a further embodiment of the method according to the invention, the indication in step d) occurs at least as a color change reaction.

BRIEF DESCRIPTION OF THE DRAWINGS

The vibration damper according to the invention and the leakage indicator according to the invention will be discussed on the basis of the drawing.

Figure 2:
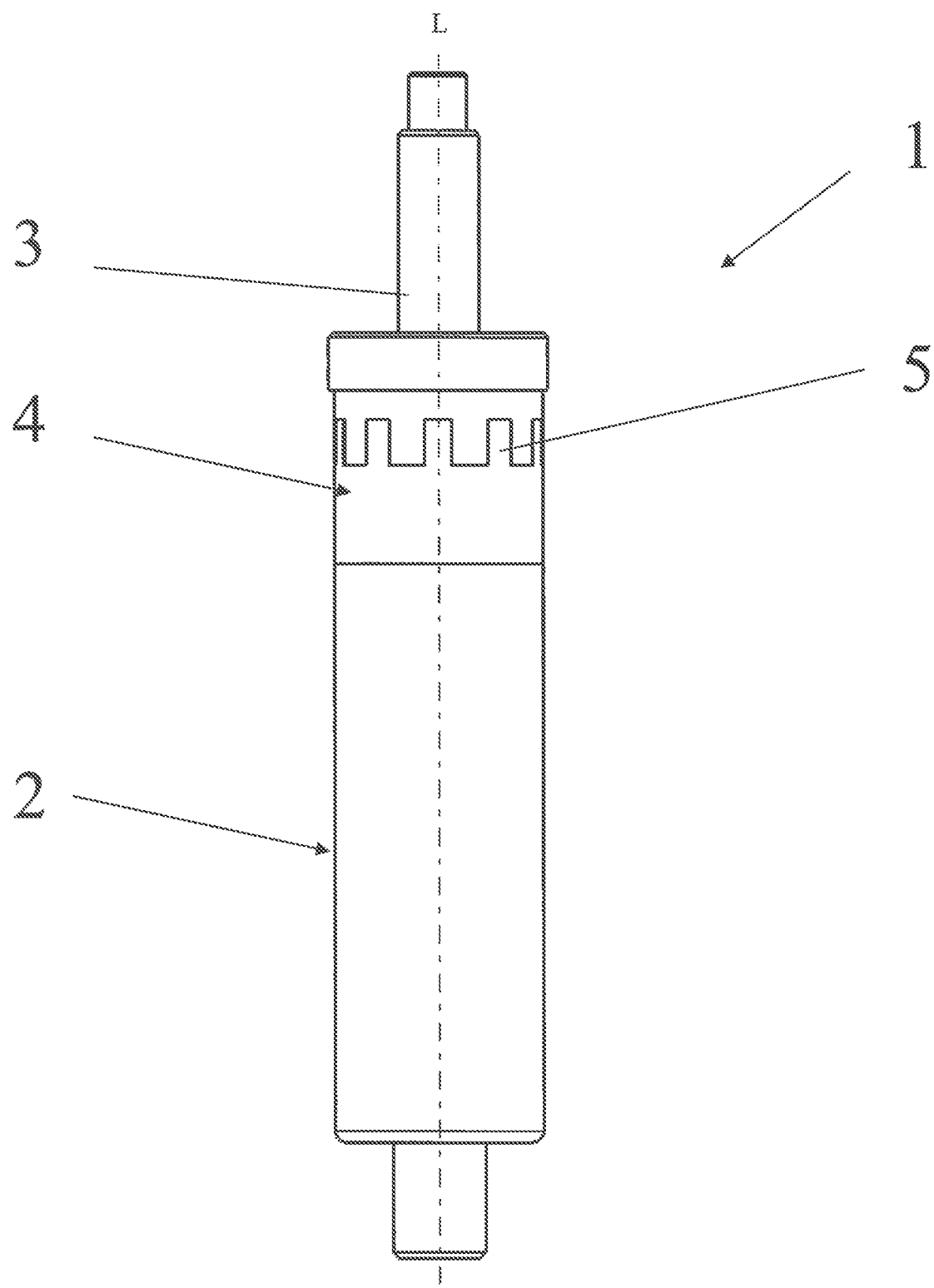
FIG. 2 is a plan view of an embodiment as per FIG. 1 with a distributing element.
Figure 3:
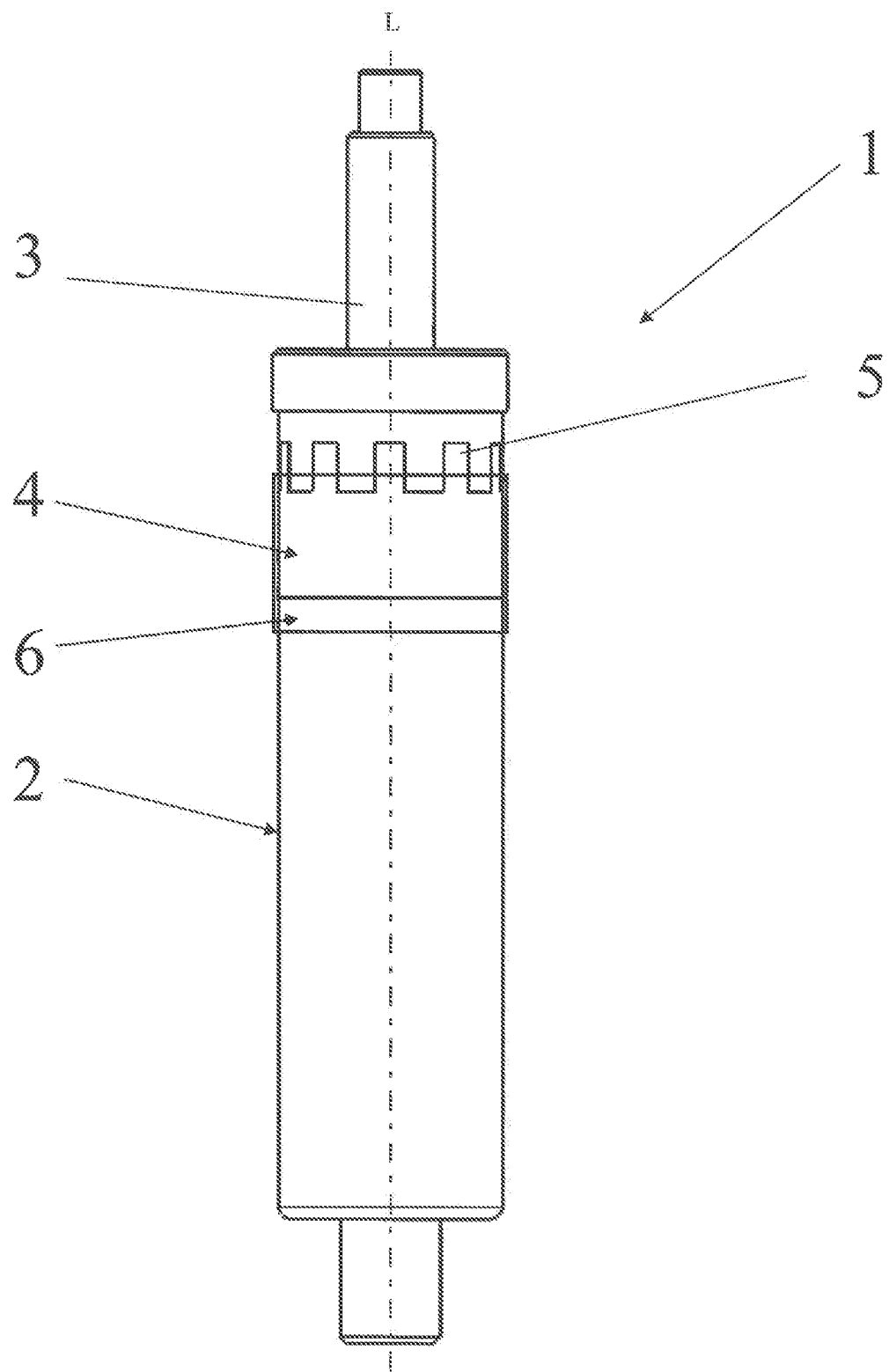
FIG. 3 is a plan view of an embodiment as per FIG. 2 with an additional protective element.

FIG. 1 shows a plan view of a vibration damper according to an embodiment of the invention, FIG. 2 shows an embodiment of the invention as per FIG. 1 with a distributing element, FIG. 3 shows an embodiment of the invention as per FIG. 2 with an additional protective element.

FIG. 1 shows a plan view of a vibration damper 1 with a damper tube 2, with a piston rod 3 and with a leakage indicator 4 according to an embodiment of the invention. The vibration damper 1 has a longitudinal axis L illustrated by means of a dashed line. The leakage indicator 4 is arranged in an encircling manner, in a circumferential direction of the damper tube, on the damper tube 1.

FIG. 2 illustrates an embodiment of the invention as per FIG. 1 with a distributing element 5. The distributing element 5 is arranged at an edge side at the leakage indicator 4 in an encircling manner, in a circumferential direction of the damper tube, on the side facing toward the piston rod 3.

FIG. 3 illustrates an embodiment of the invention as per FIG. 2 with an additional protective element 6. The protective element 6 is arranged so as to at least partially cover the leakage indicator 4.

Figure 4:
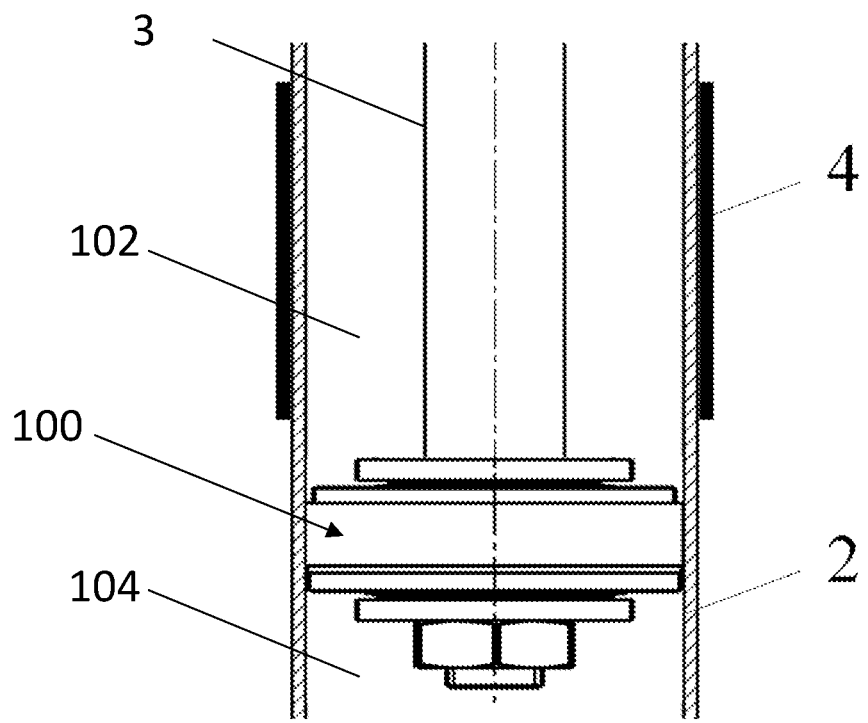
FIG. 4 is a cross-sectional view of an interior of a damper tube that is divided by a working piston into a piston-rod-side working space and a piston-rod-remote working space.

FIG. 4 shows an interior of the damper tube 2 in which the piston rod 3 is movable back and forth. A working piston 100 is movable jointly with the piston rod 3, by means of which working piston 100 the interior of the damper tube is divided into a piston-rod-side working space 102 and a piston-rod-remote working space 104.

INDUSTRIAL APPLICABILITY

Vibration dampers and leakage indicators of the above-described type are used in the production of vehicles, in particular of chassis of motor vehicles.

LIST OF REFERENCE DESIGNATIONS

1 Vibration damper
2 Damper tube
3 Piston rod
4 Leakage indicator
5 Distributing element
6 Protective element
L Longitudinal axis

What is claimed is:

1. An apparatus comprising:
   a vibration damper configured for use in a vehicle, the vibration damper comprising:
      a damper tube comprising an interior space which is at least partially filled with damper medium and which has a longitudinal axis and an outer wall,
      a piston rod movably disposed in the damper tube,
      a working piston movable jointly with the piston rod, the working piston configured to divide the interior space of the damper tube into a piston-rod-side working space and a piston-rod-remote working space, and
      a leakage indicator configured to detect leakage of damper medium from the damper, wherein the leakage indicator comprises at least one indicator reaction composition for reaction with the damper medium upon contact therewith, and wherein the leakage indicator is at least partially covered by at least one protective element.

2. The apparatus of claim 1 wherein the leakage indicator is arranged in an at least partially radially encircling manner on the damper tube.

3. The apparatus of claim 1 wherein the leakage indicator has at least one distributing element configured to at least partially distribute the damper medium at least partially in a circumferential direction of the damper tube upon contact of the damper medium with the leakage indicator.

4. The apparatus of claim 3 wherein the distributing element is an annulus, a run-off edge, a stamped protuberance, or a bead.

5. The apparatus of claim 3 wherein the distributing element completely encircles the damper tube.

6. The apparatus of claim 3 wherein the distributing element includes a plurality of teeth that protrude in an axial direction from a remainder of the distributing element.

7. The apparatus of claim 6 wherein the plurality of teeth are disposed in an encircling manner on an exterior of the damper tube.

8. The apparatus of claim 1 wherein the leakage indicator comprises at least one color change composition.

9. The apparatus of claim 1 wherein the leakage indicator is disposed on the outer wall of the damper tube in an at least partially radially encircling manner.

10. The apparatus of claim 1 wherein the leakage indicator is disposed on an exterior of the outer wall of the damper tube.

11. The apparatus of claim 1 wherein the damper medium is a damping gas.

12. The apparatus of claim 1 wherein the leakage indicator is visible on an exterior of an outer cylindrical surface of the damper tube.

13. The apparatus of claim 1 wherein the protective element is a film, a hose, a lacquer, or a sealant.

14. A method for indicating leakage of a vibration damper that is configured for use in a vehicle, the damper comprising a damper tube comprising an interior space which is at least partially filled with damper medium, a piston rod movably disposed in the damper tube, a working piston configured to divide the interior space of the damper tube into a piston-rod-side working space and a piston-rod-remote working space, and a leakage indicator configured to detect leakage of damper medium from the damper, wherein the leakage indicator comprises at least one indicator reaction composition for reaction with the damper medium upon contact therewith, and wherein the leakage indicator is at least partially covered by at least one protective element, the method comprising:
    permitting contact of the damper medium, which has at least partially escaped from the damper, with the leakage indicator, and
    indicating contact of the damper medium with the leakage indicator.

15. The method of claim 14 wherein the vibration damper further comprises at least one distributing element configured to distribute the escaped damper medium in a circumferential direction of the damper tube.

16. The method of claim 14 wherein said indicating comprises a color change reaction.

17. The method of claim 14 wherein the leakage indicator is disposed on the damper tube in an at least partially radially encircling manner.

18. The method of claim 14 comprising distributing the damper medium at least partially in a circumferential direction of the damper tube upon contact of the damper medium with the leakage indicator.

* * * * *